US007394914B2

(12) United States Patent
Hickman

(10) Patent No.: US 7,394,914 B2
(45) Date of Patent: Jul. 1, 2008

(54) SINGLE PASS OFF-LINE VIDEO ENCODING

(75) Inventor: Robert Hickman, Lyneham (GB)

(73) Assignee: Bowe Bell + Howell Company, Durham, NC (US)

( * ) Notice: Subject to any disclaimer, the term of this patent is extended or adjusted under 35 U.S.C. 154(b) by 675 days.

(21) Appl. No.: 10/857,182

(22) Filed: Jun. 1, 2004

(65) Prior Publication Data

US 2005/0025340 A1 Feb. 3, 2005

(30) Foreign Application Priority Data

Jun. 6, 2003 (DE) ................................ 103 26 145

(51) Int. Cl.
*G06K 9/00* (2006.01)

(52) U.S. Cl. ........................ 382/101; 382/175; 700/225

(58) Field of Classification Search ................. 382/100, 382/101, 102–103, 112, 113, 149, 155, 173–175, 382/181–189, 202, 219, 274–276, 284, 292, 382/305, 321, 168, 318, 319; 209/584; 705/404; 235/375; 700/226, 225
See application file for complete search history.

(56) References Cited

U.S. PATENT DOCUMENTS 4,992,649 A 2/1991 Mampe et al.
5,031,223 A 7/1991 Rosenbaum et al.
5,325,303 A * 6/1994 Walz et al. .................. 705/404
5,703,783 A 12/1997 Allen et al.
6,292,709 B1 * 9/2001 Uhl et al. .................... 700/226
6,303,889 B1 * 10/2001 Hayduchok et al. ......... 209/584
6,520,407 B1 * 2/2003 Nieswand et al. ........... 235/375
6,674,038 B1 * 1/2004 Latta .......................... 209/584
6,977,353 B1 * 12/2005 Avant et al. ................ 209/584
2003/0012407 A1 1/2003 Rosenbaum et al.
2003/0045945 A1 3/2003 Lopez

FOREIGN PATENT DOCUMENTS

DE 19644163 5/1998
DE 19911116 5/2000
EP 0424728 5/1991

(Continued)

*Primary Examiner*—Seyed Azarian
(74) *Attorney, Agent, or Firm*—McDermott Will & Emery LLP

(57) ABSTRACT

Method of automatically sorting mail 1 which has to be forwarded by means of a sorting machine, which processes the mail 1 in a continuous main stream A and where the sorting machine comprises a feeder 2 via which a variety of unsorted addressed mail is fed. The singled mail 1 is marked with an individualising identifier by a following marking device. Each identifier is assigned to a data set in a file, and by means of a following reading device 5 the addresses on the mail 1 are taken up. A taken-up address is deciphered by a recognition module and is written in the corresponding data set. The mail 1 is assigned a corresponding error information when the address cannot be deciphered. A mail piece with assigned error information is then sorted out of the main stream as scrap mail 6. The scrap mail 6 is fed again together with the unsorted mail 1 into the feeder 2 after the address has been verified and has been written in the corresponding data set, and the fed again scrap mail 6 is automatically recognised as such.

9 Claims, 3 Drawing Sheets

FOREIGN PATENT DOCUMENTS

| | | |
|---|---|---|
| EP | 0589119 | 3/1994 |
| JP | 07-086437 | 4/1995 |
| JP | 2001-270983 | 3/2003 |
| WO | WO 2000-054898 | 9/2000 |
| WO | WO 2003-004178 | 1/2003 |
| WO | WO 2003-035282 | 5/2003 |

* cited by examiner

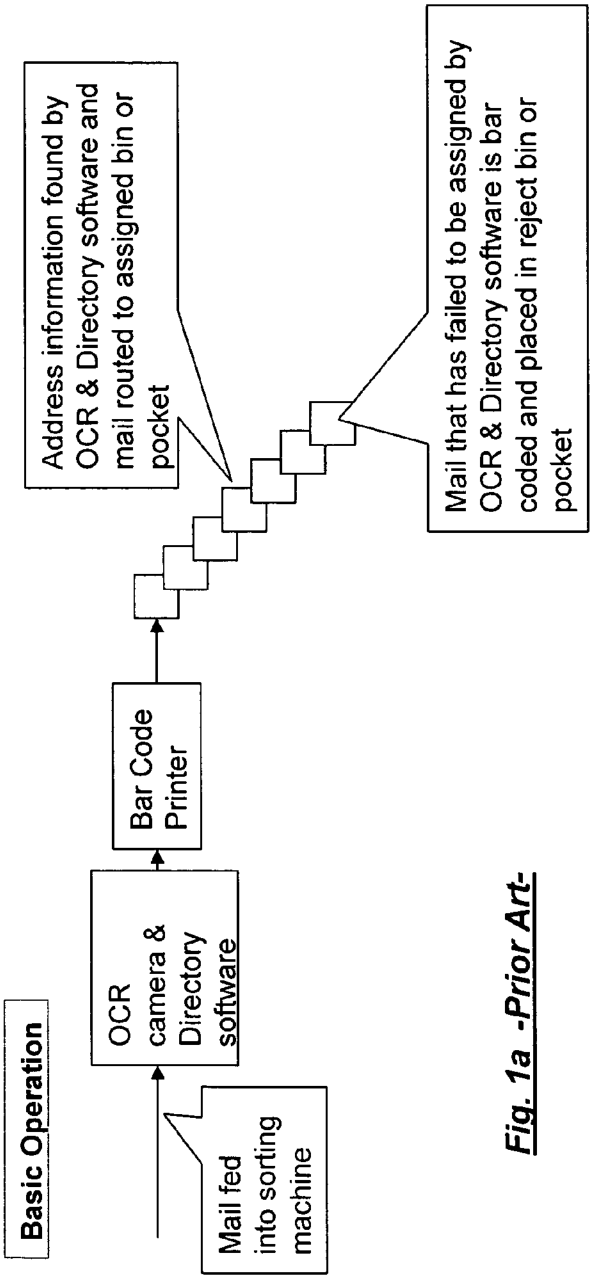
Fig. 1a -Prior Art-
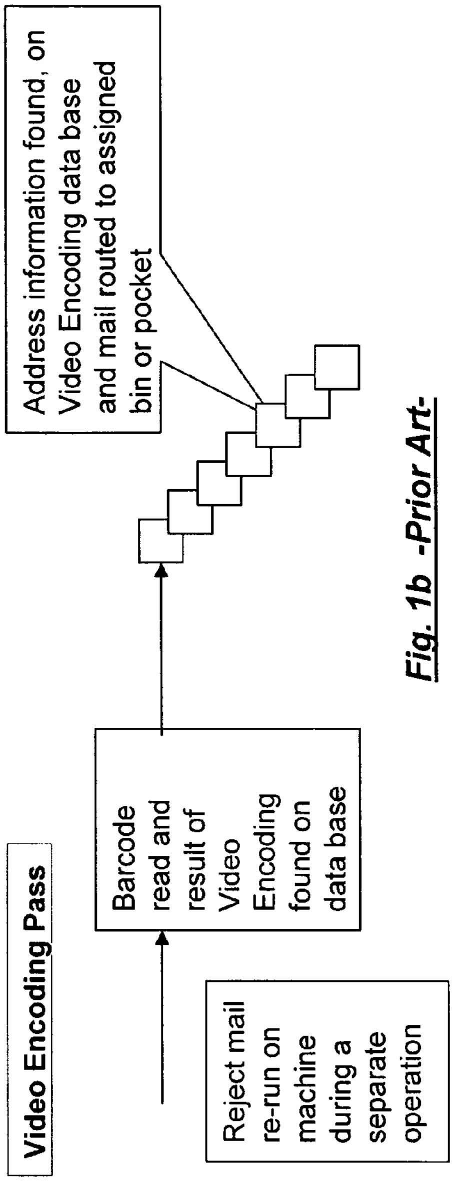
Fig. 1b -Prior Art-

SINGLE PASS OFF-LINE VIDEO ENCODING

RELATED APPLICATIONS

This application claims the benefit of German Application No. 10326145.1 Filed Jun. 6, 2003, the disclosure of which also is entirely incorporated herein by reference.

TECHNICAL FIELD

The present subject matter relates to methods and equipment for automatically sorting mail, which provide efficient handling of mail pieces for which address data is not initially machine readable.

BACKGROUND

Many mail sorting systems utilize scanning and optical character recognition to detect destination information for use in sorting mail pieces. In such procedures, the information important for the corresponding mail, namely the recognized addresses, are maintained in a database. However, some mail pieces do not have readable ZIP code or other address information, that is to say such pieces lack information detectable by the optical character recognition equipment and software. These pieces are considered as rejects or scrap mail. A video encoding technique has been developed to handle such rejects.

If a piece is rejected, the video image of the mail piece is saved and presented to a keying operator. The operator keys in the address information manually read from the piece, at least to the extent necessary to enable sorting. The keyed data is stored in a record in the database, and a corresponding bar code or other ID tag is printed on the mail piece. During subsequent sorting, the piece can be recognized and sorted in response to the printed ID tag and the keyed data.

Video Encoding thus provides coding of mail for sorting machines, when the OCR (Optical Character Recognition) and directory software has failed to resolve the address on the mail piece. One industry standard implementation of a Video Encode process is "on-line" in that the reject is video encoded without removal from the mail stream. However, on-line encoding requires a long delay line, which delays the mail piece reaching the sorter stacker sufficiently to allow for encoding of the scrap mail piece.

The alternative standard approach, referred to as an Off-Line Video Encode operation involves sorting out the rejects during a first pass (FIG. 1*a*) and video encoding the rejects. Then, a separate pass through the sorter (FIG. 1*b*) is used to re-run only the mail that has been coded by the Video Encoding operators.

The disadvantage of the On-Line method is the extent of the necessary delay. The disadvantage of the Off-Line approach is that the sorting machine has to be configured especially for the separate run to handle the video encoded scrap mail. This is not "user friendly" to the machine operator, since the operator has to stop the "Machine First Pass" and select a special pass to run the Video Encoded mail. The separate sorting run incurs an additional expenditure of work and time, and thereby leads to increased costs. Further, these separate runs interrupt the continuity in the workflow of the machine. Altogether, the Off-Line processing of the scrap mails overstrains the machine's efficiency excessively.

SUMMARY

Hence, an objective is to provide a method which can easily be realised, which enables a continuous working of a sorting machine in combination with Off-Line video encoding of scrap mail, yet which leads to increased processing speed while diminishing the incurred costs. The methods described below, typically referred to as "Single Pass Off-Line Video Encoding," enable the machine operator to place the mail, which has been sent for Video Encoding, back onto the sorter machine feeder at any time during the first pass without the need to select a special pass.

Mail pieces with readable addresses are scanned, tagged and sorted in the normal manner. Scrap mail is marked with identifiers, but error information is initially associated with those identifiers, in the sorting database. After a scrap mail piece is sorted out of the stream, that mail piece is manually read and its address entered in the database, in association with its identifier, for example, by an Off-Line Video Encode operation. Encoded scrap mail pieces are placed back into the mail stream on the sorter, with other unsorted mail of the stream, and encoded scrap mail is sorted based on the manually entered address data as the other mail is sorted based on the optically recognized address data.

The sorter includes a reader in the line, before the printer that applies the identifiers to the mail pieces. When an encoded scrap mail piece passes through the line a second time, the reader detects the previously printed identifier, so as to prevent writing of another identifier or again marking/processing the mail piece as scrap. However, on the second pass through the sorter, the identifier allows retrieval of the manually entered address data from the database, to allow the system to sort the scrap mail piece into the appropriate destination bin, pocket or stacker.

Hence a method is provided of automatically sorting mail which has to be forwarded by means of a sorting machine, which processes the mail in a continuous main stream. The sorting machine comprises a feeder via which a variety of unsorted addressed mail is fed. The singled mail is marked with an individualising identifier by a following marking device. Each identifier is assigned to a data set in a file. A following reading device detects addresses on the mail, and a detected address is deciphered by a recognition module and is written in the corresponding data set. The mail is assigned a corresponding error information when the address cannot be deciphered, and any mail with assigned error information is then sorted out of the main stream as scrap mail. The scrap mail is fed again together with the unsorted mail into the feeder after the address on the scrap mail has been verified and has been written in the corresponding data set. The fed again scrap mail is automatically recognized as such, during continuing sorting of the pieces of the mail stream.

The method is set up in a way that "corrected" scraps are fed into the process together with the up to now unsorted mail via the same feeder and are processed together with them in a row. In order not to come into conflict with the system of the succeeding process by a double marking. Another aspect of the disclosed method lies in the recognition and registration of the scrap mail. The recognition can be realised via hardware or software. The method facilitates the feeding of the verified scrap mail pieces which have been completed with respect to their address back into the feeder of the machine at any time during the first run without the need for a special separate run.

Even though any mail may be sorted with the method, it may especially be applied for mail which is delivered stackwise in huge amounts and which is singled by means of a decollator assigned to the feeder.

Advantages of the method are obvious. While after the known method a sorting machine is divided into two different operating modes and has therefore to be run discontinuously in order to process scrap mails, a machine realising the method according to the present concept(s) can stay in the same mode and can sort "fresh" mail together with corrected scrap mail in a continuous process. This leads to an increased processing speed. While using this method, no further capacity of work is needed for switching over the machine. These factors help to enable a drastic reduction of costs while sorting the mail. It is especially advantageous if the verified scrap mails run through the process together with the usual mail from the very beginning and are not fed into the process in-between, for which a gap in the otherwise continuous stream of mail would be required. Exactly this can ensure the continuity of the process.

An advantageous embodiment of the method with respect to an optimised organisation avoids the repeated marking of the scrap mails that have already been marked before. As these are excepted from being marked with a further tag, the data set, which has already been started for the mail, remains and only needs to be completed by the lacking address data. By keeping this special data set, the history of the processing of the mail can be comprehended at a later time. By renunciation of the further marking, it may furthermore be avoided that several markings are attached on top of each other. The easiest way of detecting the existing marking on the scrap mail that is fed again, is by means of a detector positioned upstream from the marking device. The detector can be realised as a simple reading device, which is sensitive especially for these markings. It is, however, also possible to realise the recognition via the video recording that has been taken beforehand.

In order to ensure the reliable sorting-out of mail with non-deciphered addresses, it is necessary to assign the error information to the corresponding mail. An assignment can take place via the software, where the error information is coded in the data set. There, the coding can either lie in the explicit writing of the data set with the error information or in not filling necessary fields. The program detects the existing error information when the mail passes a detector. Through the error information, a switch is controlled by which the mail is branched off. By this, the mail with the attached error information is recognised by the tag attached thereto by an ante positioned detector and is automatically sorted out of the main stream by means of a switch controlled by the detector.

Instead of realising the assignment of the error message via software, as described, a solution which makes in a way use of hardware may also be advantageous. Here, the mail itself is marked with a sign, which indicates the error. This can take place by tagging the mail, which tag may especially be realised as a barcode, by means of a writing device positioned in the main stream after the reading device. In this tag, the information gained by means of the reading device, especially the error information, is coded. In this way, the mail is independent from the connection to the database and may be processed by any system.

In the further processing of the mail, it is advantageous if the error information assigned to the mail is recognised by an ante positioned detector by its tag. The output signal of the detector can be used for controlling a switch so that the mail in question is automatically sorted out of the main stream by means of a switch controlled by the detector.

In an especially advantageous embodiment, the scrap mail is fed automatically back into the process after the special treatment. For this, it is forwarded to a buffer via a side stream branched off the main stream, in which it remains until the address is verified. After the verification the scrap mail is automatically added to the mail in the feeder.

Of course the mail, which has first been tagged as scrap mail is rid of the error message as soon as the correct address is written into the data set. This ridding can again either take place via software, where the now revised data set is recognised as correct. The mail runs through the process without being sorted out again. In the hardware solution, the corresponding tag can be overwritten so that the following detector recognises the mail as unproblematic.

In an advantageous embodiment of the method, each mail piece processed by the sorter is scanned and the recorded picture is stored together with the explicit identification tag. The identification tag is also printed onto the mail and is used for identification in the following stages. When a mail already has an identification tag, it is read and compared with the marks in the database. Mail which has been read by the OCR before and has been assigned to a destination, is, according to the chosen sorting plan, automatically sorted into the correct feeder of the sorter. Pieces of mail that cannot be recognised by the OCR, are transferred to a corresponding feeder to wait for the result of the verification before they are again fed into the process.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWING

The drawing figures depict one or more implementations in accord with the present concepts, by way of example only, not by way of limitations. In the figures, like reference numerals refer to the same or similar elements.

FIGS. 1*a* and 1*b* are logical flow diagrams representing the two sorting passes needed in prior art systems to process a mail stream, for an Off-Line Video Encode of those mail pieces that have address data that can not be recognized for sorting purposes in the first pass.

DETAILED DESCRIPTION

Figure 2:
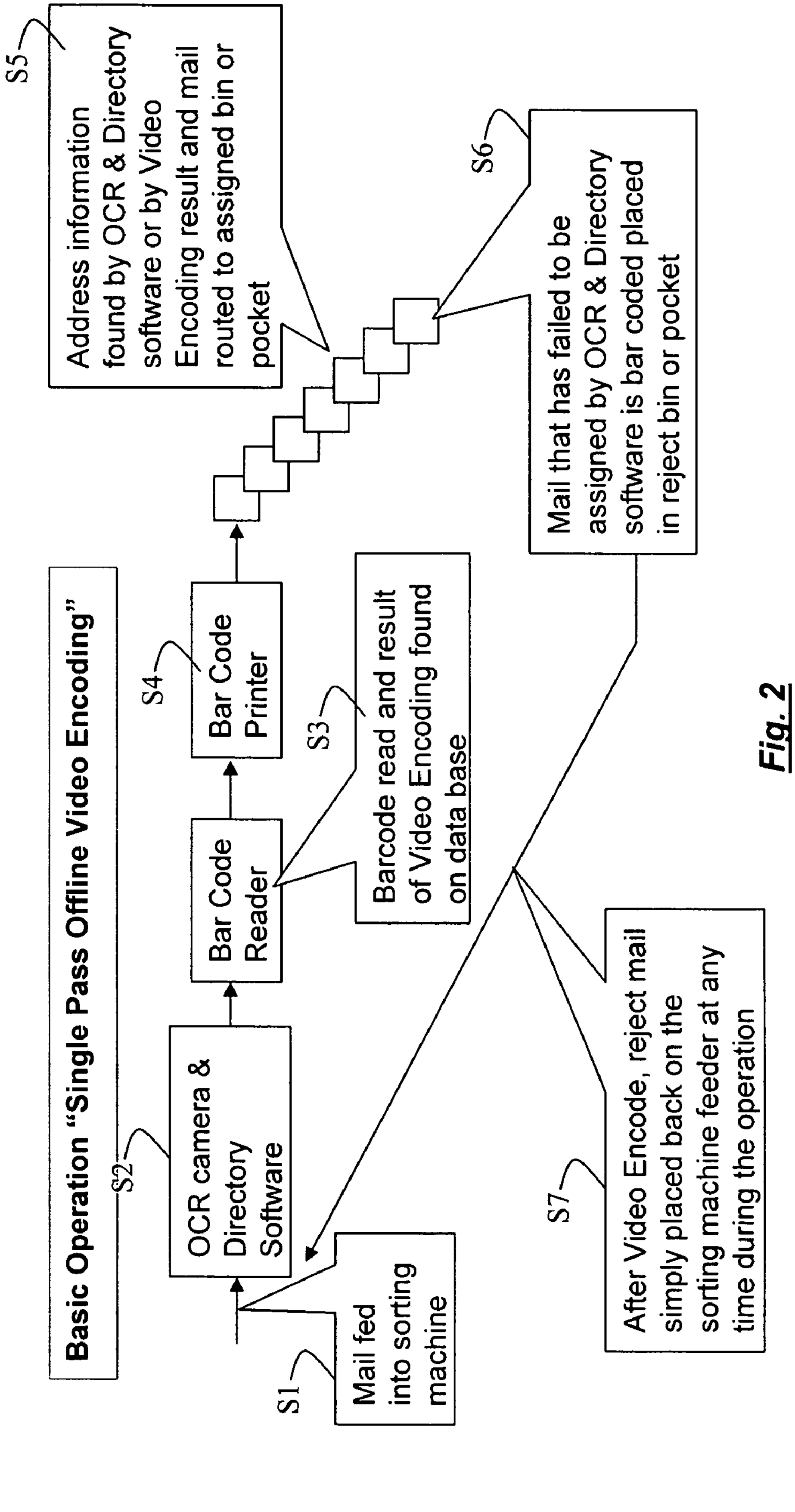
FIG. 2 is logical flow diagram showing a single pass sorting process, with an Off-Line Video Encode operation.

The method of operation described below enables the machine operator to place the mail, which has been sent for Video Encoding, back onto the sorter machine feeder at any time during the first pass without the need to select a special pass. FIG. 2 shows such a process flow.

At step S1 a stream of mail pieces is fed into the sorting machine. Every mail piece processed by the sorter is scanned and the image stored together with a unique ID tag, in step S2. The scanning is performed by a camera, and OCR software processes the scanned address data to recognize characters. From the characters, the software derives and validates addresses, and it associates each valid address with an ID tag. The software then stores the address and tag in a data set in a database.

A bar code scanner at step S3 scans each mail piece and recognizes any bar coded ID tags printed thereon during an earlier pass through the system. Mail that is initially passing through the system will not have such a tag. Instead, a printer at step S4 prints the ID tag on the mail piece, typically in bar code form. The bar coded (or other format) ID tag is used for identification and sorting in a subsequent pass through the system, if necessary. Each reject or scrap mail piece that has failed to be assigned by OCR & Directory software is printed with an ID tag, however, appropriate error information is recorded in the database in association with the ID tag of the scrap mail piece.

At step S5, address information found by OCR & Directory software (or by detected bar coding from Video Encoding as discussed below) is sorted to an assigned bin or pocket in the normal manner. However, at step S6, reject or scrap mail that has failed to be assigned by OCR & Directory software (and has error information recorded in the database) is sorted out and placed in reject bin or pocket, based on the printed ID tags.

The mail from the scrap bin or pocket undergoes Off-Line video encoding. As outlined earlier, the video image of the mail piece has been saved, and the saved image is presented to a keying operator. The operator manually keys in the address information manually read from the piece, at least to the extent necessary to enable sorting. The keyed data is stored in a record in the database, and associated with the bar code ID tag printed on the scrap mail piece. Alternatively, a new tag may be printed on the mail piece during the Video Encode operation. The Video Encode result (manually entered address) is associated with the ID tag for the scrap mail piece in the sorting database. After the Video Encode operation, the reject mail is simply placed back on the sorting machine feeder at any time during the operation (step S7), with other mail pieces in the stream.

The sorter need not be stopped and run in a different manner to handle the scrap mail. The encoded scrap mail is replaced in the mail stream (e.g. back at S1), with other continuously processed mail pieces.

On the subsequent passage through the sorter, the bar code reader detects the printed code already on the encoded scrap mail (at S3), and the controller (not shown) controls the bar code printer at S4 to not print any new code on the particular piece. Now, when the scrap mail reaches the processing at step S5, the bar code and the associated record in the database (obtained from the Video Encode operation) allows the system to sort the mail into the appropriate bin or pocket, in the same manner as for mail that had addresses detected by OCR on their first pass through the sorting line.

To summarize, mail pieces that are read by the OCR and assigned a destination are automatically sorted to the correct stacker, bin or pocket, according to the sort scheme selected. Mail pieces that were not resolved by the OCR are routed to a designated stacker, to wait for the Video Coding result. Then, after the Video Encode operation, the encoded scrap pieces are re-run on the sorter and otherwise sorted in the normal manner.

A unique feature of the Single Pass Off-line Video Encoding is the absence of a special Video Encoding pass. During the first pass mail accumulating in the bin or other destination designated for Video Coding can simply be added to the mail on the sorter machine feeder conveyor. The machine software will detect the presence of a tag code and check the tag code database for a Video coding result. This Single Pass Off-line Video Encoding simplifies the process for the machine operators, whilst increasing the efficiency of the process.

Figure 3:
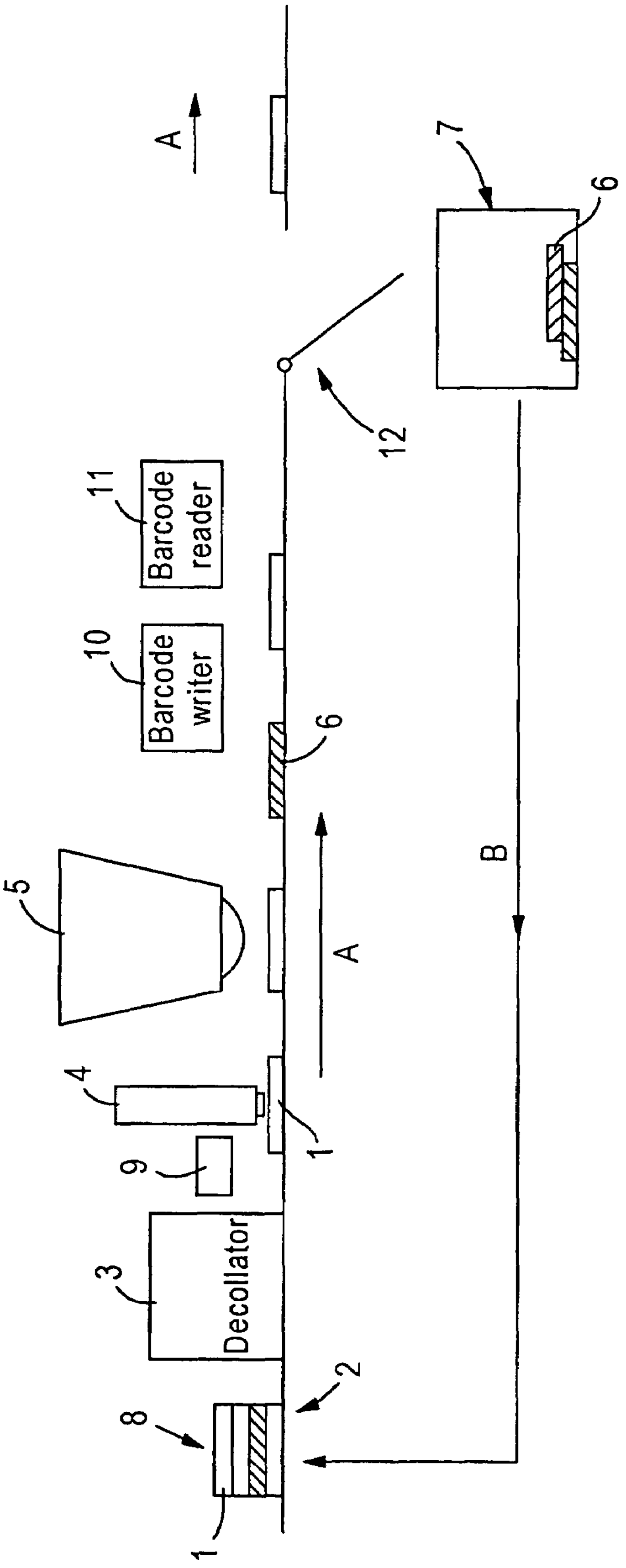
FIG. 3 is a functional block diagram of an exemplary sorting line, for implementing the process of FIG. 2.

In FIG. 3, the method of automatically sorting mail 1 to be passed on by means of a sorting machine is shown schematically, where the mail is processed in a continuous main stream along arrow A by the exemplary sorting machine. The machine comprises a feeder 2, via which a stack 8 of addressed mail is fed. In a decollator 3, the stack is singled and a following marking device 4 marks the singled mail with an individualising tag. Each tag is assigned to a data set or a file. With a video reading device 5, the mail is thereafter photographed. A translation program tries to detect the address from the photo of the mail 1. When a recognition module can decipher the address, it is written into a database record assigned to the mail 1. If the translation was not successful, the mail 1 is assigned a corresponding error information. A mail 1 with assigned error information is sorted out of the mainstream as scrap mail 6 and is stored in a buffer 7.

After the address has been verified and written into the dataset, typically by a manual Video Encode operation, a scrap mail piece 6 is laid back onto the stack 8 together with the unsorted mail and is fed again into the feeder 2. The scrap mail that is fed again is detected as such automatically and is excepted from being marked with another tag. In this example, the scrap mail that is fed again is recognised as such by its existing tag by a simple detector 9, which is positioned before the marking device 4.

The mail is marked with a barcode by a writing device 10 which is positioned after the reading device 5 in the mainstream, which writing device 10 codes the information gained by the reading device 5, especially the error information. The error message assigned to the mail is identified by its barcode by an ante positioned reading detector 11 and is sorted out of the mainstream by means of a diverter such as the switch 12 controlled by the detector 11 and is stored in the buffer 7. It stays there until the address is verified, where the scrap mail 6 is, via the way (arrowhead B), automatically added to the mail that is stacked in the feeder 2 after verification.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method of automatically sorting mail, which has to be forwarded, by means of a sorting machine that processes the mail in a continuous main stream and where the sorting machine comprises a feeder via which a variety of unsorted addressed mail is fed, the method comprising:

marking singled mail with an individualizing identifier by an ante positioned marking device;

assigning each identifier to a data set in a file;

detecting addresses on pieces of the mail by an ante positioned reading device;

deciphering each detected address by a recognition module;

writing each detected address in the corresponding data set;

assigning a corresponding error information to a mail piece when the address on that mail piece cannot be deciphered, wherein the error information is coded in the data set, and the coding lies in the explicit writing of the data set or in not filling necessary fields;

sorting the mail with assigned error information out of the main stream as scrap mail, wherein the scrap mail tagged with an error information is recognized by the assigned tag and the data set assigned to the tag; and the scrap mail is sorted out of the main stream by means of a switch controlled by the detector; and feeding the scrap mail again into the feeder together with additional unsorted mail after the address of the scrap mail has been verified and has been written in a corresponding data set, wherein the fed again scrap mail is automatically recognized as such.

2. The method according to claim 1, wherein the mail that is to be forwarded is mail that is delivered in stacks, and is singled by a decollator corresponding with the feeder.

3. The method according to claim 1, wherein the fed again scrap mail is excepted from being marked with a further tag.

4. The method according to claim 3, wherein the fed again scrap mail is recognized by a detector positioned before the marking device by its existing tag.

5. The method according to claim 1, wherein a mail piece is tagged with a barcode marking by a writing device positioned in the main stream after the reading device, especially by a barcode, which codes the error information, which has been detected by the reading device.

6. The method according to claim 5, wherein:

the error message assigned to the scrap mail is recognized by an ante positioned detector by its tag; and the scrap mail is sorted out of the main stream by a switch which is controlled by the detector.

7. The method according to claim 1, wherein:

a scrap mail piece is fed into a buffer via a side stream branched off the main stream, in which it remains until the address is verified; and the scrap mail piece is automatically added to the mail in the feeder after verification.

8. An apparatus for automatically sorting mail to be forwarded, by processing the mail in a continuous main stream, the sorting machine comprising:

a feeder via which a variety of unsorted addressed mail pieces are fed along the main stream;

an ante positioned marking device for marking each singled mail piece with an individualizing identifier, each identifier being assigned to a data set in a file;

an ante positioned reading device for detecting addresses on the mail pieces;

a recognition module for attempting to decipher each detected address, wherein each detected address that is deciphered is written in the corresponding data set, and a mail piece is assigned a corresponding error information when the address detected from the mail piece cannot be deciphered, wherein the error information is coded in the data set, and the coding lies in the explicit writing of the data set or in not filling necessary fields; and a diverter for sorting out the mail piece with assigned error information from the main stream, as scrap mail, wherein the scrap mail tagged with an error information is recognized by the assigned tag and the data set assigned to the tag, and the scrap mail is sorted out of the main stream by means of a switch controlled by the detector, and wherein the scrap mail is fed again into the feeder together with additional unsorted mail after the address on the scrap mail piece has been verified and has been written in the corresponding data set, and wherein the fed again scrap mail is automatically recognized as such.

9. A method of sorting mail, comprising:

receiving a stream of mail pieces;

scanning each of the mail pieces and attempting to recognize address data on each of the mail pieces;

marking each mail piece with a identifier;

for each respective mail piece having a successfully recognized address, recording the address in a database record in association with the identifier of the respective mail piece;

continuously sorting mail pieces based on the recorded addresses;

identifying a mail piece from which an address was not successfully recognized as a scrap mail piece, entering an error indicator in association with the identifier of the scrap mail piece in the database and sorting that mail piece out of the stream, wherein the error information is coded in the data set, and the coding lies in the explicit writing of the data set or in not filling necessary fields;

manually reading address data from the scrap mail piece and associating the manually read address with the identifier of the scrap mail piece in the database;

replacing the scrap mail piece back in the received stream of mail pieces; and sorting the scrap mail piece based on the manually read address, as part of ongoing continuous sorting of the mail pieces, wherein the scrap mail tagged with an error information is recognized by the assigned tag and the data set assigned to the tag, and the scrap mail is sorted out of the main stream by means of a switch controlled by the detector.

* * * * *